United States Patent [19]

Scifres

[11] 4,022,520

[45] May 10, 1977

[54] OUTSIDE REAR VIEW MIRROR ATTACHMENT FOR AUTOMOTIVE VEHICLE

[76] Inventor: Robert D. Scifres, 6955 Given Road, Cincinnati, Ohio 45243

[22] Filed: Sept. 4, 1975

[21] Appl. No.: 610,382

[52] U.S. Cl. .................................. 350/304; 248/484
[51] Int. Cl.² ............................................. G02B 5/08
[58] Field of Search .................... 350/302–304, 350/307, 299; 248/481–484; 74/501 M; D12/187, 189

[56] References Cited

UNITED STATES PATENTS

| | | | |
|---|---|---|---|
| 2,413,894 | 1/1947 | Sorensen | 350/303 |
| 2,916,967 | 12/1959 | Husak | 350/304 |
| 2,990,751 | 7/1961 | Miller | 350/304 |
| 3,424,424 | 1/1969 | Kelley | 350/299 |
| 3,712,715 | 12/1973 | Wagner | 350/304 |
| 3,826,563 | 7/1972 | Davis | 350/304 |

FOREIGN PATENTS OR APPLICATIONS 2,025,856 12/1971 Germany ....................... 350/304

*Primary Examiner*—John K. Corbin
*Assistant Examiner*—Jon W. Henry
*Attorney, Agent, or Firm*—Edmund S. Lee, III

[57] ABSTRACT

A rear view mirror assembly adapted for attachment to the outside of a motor vehicle is disclosed. The assembly comprises a fixed arm which is adapted to be attached to the motor vehicle, a disc rotatably mounted on said arm about a general horizontally axis and a pair of mirrors adjustably mounted on said disc by ball joint assemblies. By adjustment of the disc relative to the arm a desired position of the two mirrors can be obtained relative to the motor vehicle and then the mirrors themselves may independently adjusted to provide separate fields of vision which effectively eliminate any blind spots.

1 Claim, 2 Drawing Figures

OUTSIDE REAR VIEW MIRROR ATTACHMENT FOR AUTOMOTIVE VEHICLE

The present invention relates to improvements in outside mirrors provided for attachment to the body of a motor vehicle so that the driver of the motor vehicle can use the attachment as a side view mirror.

It has previously been recognized that simple, flat, rear view mirrors are deficient in providing an adequate field of vision both directly to the rear and to the side of a motor vehicle. One solution has been the use of convex mirrors, but they severely distort the relective image. Another solution is the use of plurality of flat mirrors but they are deficient in providing simple and effective adjustment.

The object of this invention is to provide improved adjustability of mirror assemblies having a plurality of fields of visions.

These ends are obtained by an outside mirror assembly which will be later described in detail, and is comprised of two mirrors, one above the other, with both mirrors being flat. Both mirrors are supported in essentially the same vertical plane but subject to be adjusted individually in accordance with the viewing needs of the drivers, each of whom are unique in this respect. The two mirrors which are independently adjustable provide two separate fields of reflected views which give an increased and total coverage of the area from the side of the vehicle and extending outward from the vehicle. A casing and a remote toggle control may be used if desired.

The area coverage by the reflected view of this outside rear view mirror assembly eliminates the dangerous blind spot which exists in almost every model of every motor vehicle manufactured in the United States. Furthermore, this invention, because of its reflected view coverage eliminating the blind spot, will eliminate the necessity of the driver turning his head to the left or right to fully determine the traffic patterns and conditions on either or both sides and to the rear of his vehicle. In so doing the driver commits a dangerous act because he momentarily is not aware of the traffic condition in front and could easily be engaged in a rear end accident. This invention, it will be appreciated, can be located on either the left or right sides of the vehicle, or both without changing the design. Also, the invention will fit any conventional car manufactured in the United States today without a change in design. With such flexibility without a design change necessary, manufacturing costs can be held to a minimum. In addition the spherical convex small mirrors which give a highly distorted reflective view will not be necessary. In summary, this invention provides for the elimination of dangers inherent with currently produced single faced side view mirrors. It also provides a basic design which will fit onto all cars manufactured in the United States and on either side of such cars. The two mirrors included in this invention provide two undistorted views of the area to the rear of the side of the vehicle. One reflective view covering the area next to the vehicle and the other reflective view covering the area outside the area covered by the first mirror.

If the desired position of the mirrors is one adjacent to the other rather than one above the other, to rotating disc need only be turned accordingly. An expanded version of this invention could apply to trucks equally as well as passenger cars.

DESCRIPTION

This invention covers three models employing the same concept.

Figure 1:
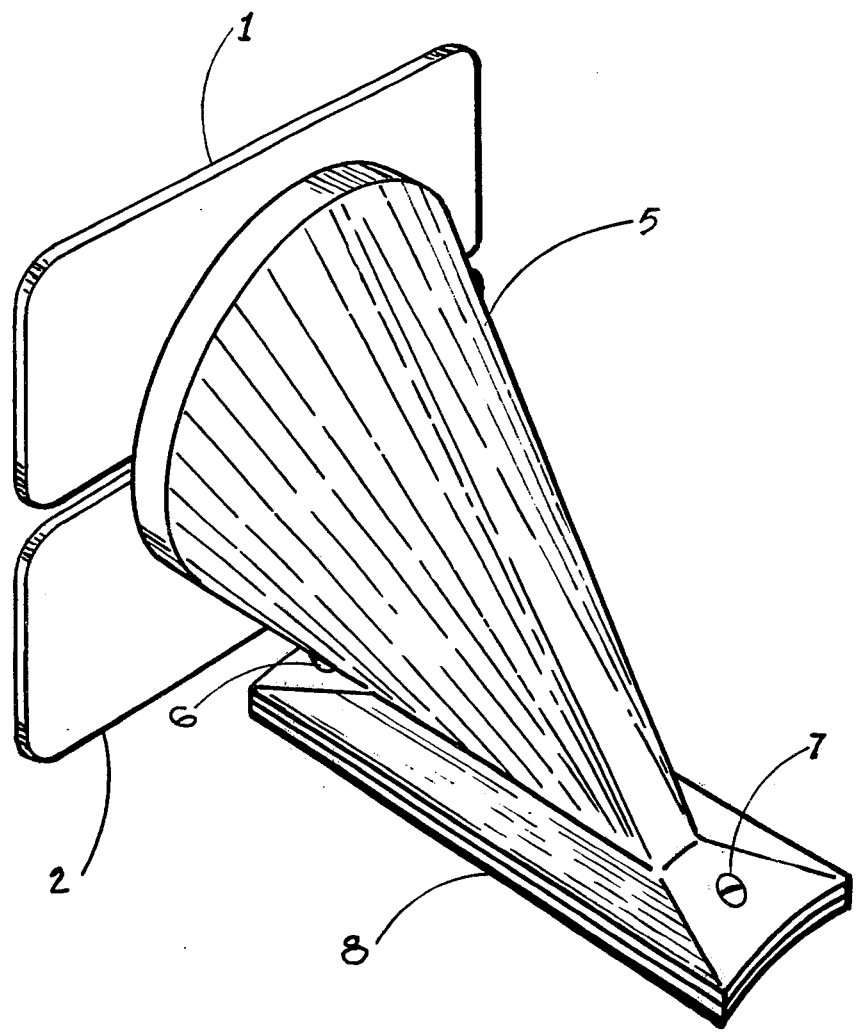
FIG. 1 is an isometric view with components appropriately identified.
Figure 2:
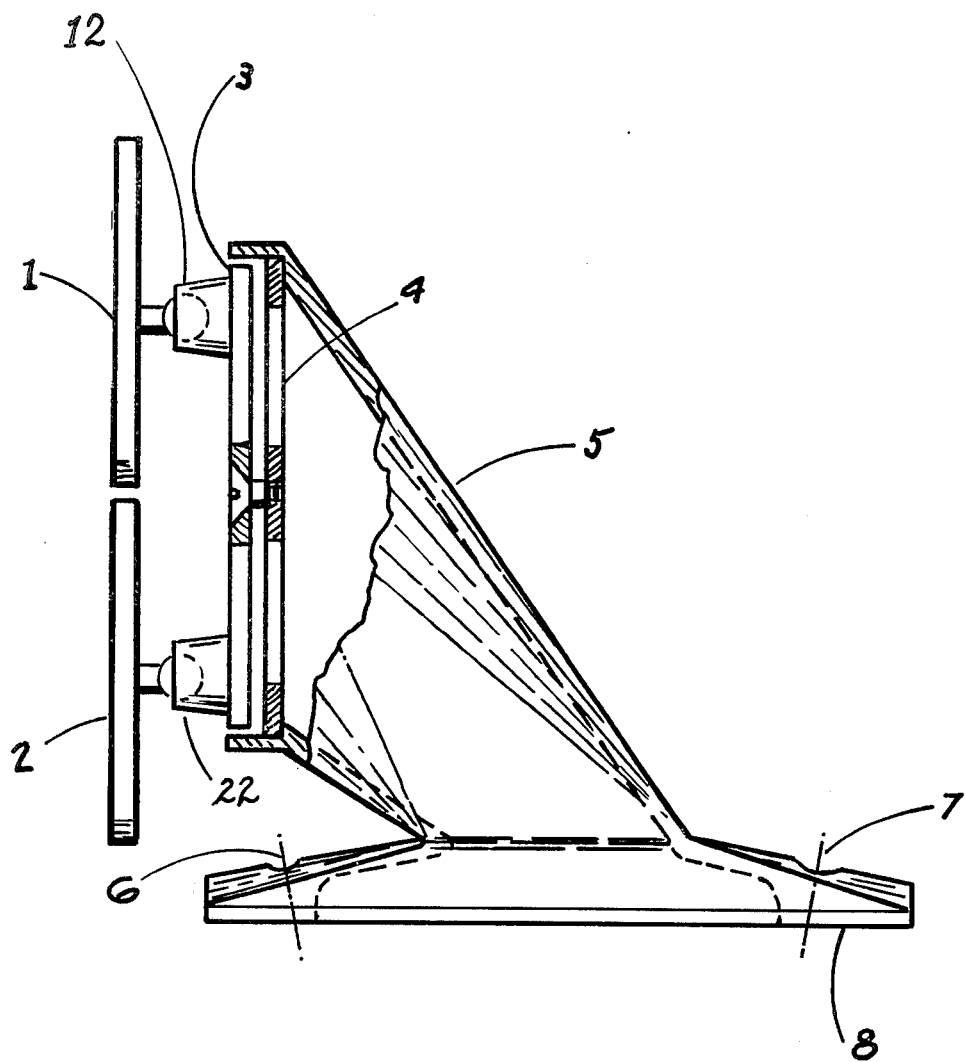
FIG. 2 is a cut away side view also with components appropriately identified.

1. The basic model which is illustrated in FIGS. 1 and 2.
2. The deluxe model which merely adds to the basic model a hood or case which encompasses the mirror section and is attached to the outside perimeter of the rotating disc. In this manner the mirrors will always occupy the same position within the hood.
3. Remote control model incorporates the familiar toggle control system to the deluxe model. Cables from the toggle lever pass through the mounting arm and through spaces in the two discs for access to the controls on each mirror. Each outside mirror assembly, therefore, has two toggle levers and control cables, one for each mirror.

The basic model, therefore, becomes the primary object for detailed description which follows:

Mirrors 1 and 2 are independent of each other and can be adjusted to any angle as required. The adjustments, or positioning, are accomplished through the use of ball joint assemblies 12 and 22. Mirror 1 is attached to rotating disc 3 by ball joint assembly 12 and mirror 2 is attached to rotating disc 3 by ball joint assembly 22. Rotating disc 3 is positioned against fixed disc 4 so that mirrors 1 and 2 are horizontal to the ground surface or at an angle depending upon the requirement of the vehicle driver. When the desired position of the rotating disc 3 is determined, tighten the retaining bolt or similar type fastener so that rotating disc 3 will hold fast against fixed disc 4. To assure the secure position of disc 3 against disc 4 a tongue and groove or similar type locking system can be employed. Fixed disc 3 is part of mounting arm 5, providing solidarity to the top portion of the mounting arm 5. The base of the mounting arm is attached to the body of the vehicle through the use of fasteners (screws) 6 and 7 in the conventional manner. As gasket 8 is used to provide an even base for the mounting arm as well as for protection to the finish of the vehicle.

While the basic model of the invention have been described in detail, with simple descriptions of modifications included for an additional appearance item (the hood or case) and a mechanical item (the remote toggle control system), further modifications may be made. It is intended in the following claims to cover all modifications which come within the spirit and scope of this invention.

I claim:

1. An outside rear view mirror assembly adapted to be mounted on a motor vehicle and comprising
   a mounting arm for attachment in fixed relation to the side of the motor vehicle,
   a disc angularly adjustable relative to said arm about a generally horizontal axis which is generally parallel to the path of travel of the motor vehicle,
   means for holding said disc in a fixed adjusted position relative to said arm,
   first and second flat mirrors and
   ball joint means mounting said mirrors on said disc for independent, angular adjustment relative to said disc,
   whereby the desired relative angles between the two mirrors may be established to obtain a combined field of vision which essentially eliminates blind spots from the rear of the motor vehicle and with the two mirrors in a desired relative position to each other.

* * * * *